United States Patent
Ochiai et al.

[11] Patent Number: 5,394,205
[45] Date of Patent: Feb. 28, 1995

[54] IMAGE READING APPARATUS

[75] Inventors: Toru Ochiai, Tokyo; Masahiro Mochizuki, Kawasaki; Soichi Ikeda, Yaita; Katsuhiro Sato, Kuroiso, all of Japan

[73] Assignee: Nikon Corporation, Tokyo, Japan

[21] Appl. No.: 222,724

[22] Filed: Mar. 30, 1994

Related U.S. Application Data

[63] Continuation of Ser. No. 796,598, Nov. 22, 1991, abandoned.

[30] Foreign Application Priority Data

Nov. 29, 1990 [JP] Japan ............... 2-325695
Dec. 25, 1990 [JP] Japan ............... 2-414524

[51] Int. Cl.⁶ .............................................. G03B 3/10
[52] U.S. Cl. ........................................ 353/101; 352/140
[58] Field of Search .............. 353/101, 100, 122, 69; 354/402, 404; 355/44, 55, 56; 352/139, 140

[56] References Cited

U.S. PATENT DOCUMENTS

| | | | |
|---|---|---|---|
| 3,264,935 | 8/1966 | Vose | 353/101 |
| 3,628,863 | 12/1971 | Kottler et al. | 353/101 |
| 3,813,155 | 5/1974 | Szymber et al. | 353/101 |
| 4,415,244 | 11/1983 | Daly et al. | 353/101 |
| 4,494,839 | 1/1985 | Brueckner | 353/101 |
| 4,714,331 | 12/1987 | Oda et al. | 353/101 |
| 4,743,109 | 5/1988 | Harvey | 353/101 |

Primary Examiner—William A. Cuchlinski, Jr.
Assistant Examiner—William C. Dowling
Attorney, Agent, or Firm—Shapiro and Shapiro

[57] ABSTRACT

An apparatus comprises an image sensing optical system including an image pickup element for converting an image to an electrical signal and a projection lens for projecting an image onto a photo-sensing plane of the image pickup element. The image sensing optical system is driven along an optical axis thereof while maintaining a relative positional relationship between the projection lens and the image pickup element to adjust the focal position. An apparatus may also comprise an image sensing optical system including an image pickup element for scanning an image to convert it to an electrical signal and a projection lens for projecting an image onto a photo-sensing plane of the image pickup element, a focus adjusting device for adjusting a focal position of the image sensing optical system and a detector for detecting an in-focus position of the image sensing optical system to the object. The focus adjusting device is controlled in accordance with the output of the detector so that the object is always within a depth of focus of the image sensing optical system.

6 Claims, 9 Drawing Sheets

IMAGE READING APPARATUS

This is a continuation of application Ser. No. 07/796,598, filed Nov. 22, 1991, now abandoned.

BACKGROUND OF THE INVENTION

1. Field of the Invention

The present invention relates to an image reading apparatus for a slide film or the like.

2. Related Background Art

Figure 1:
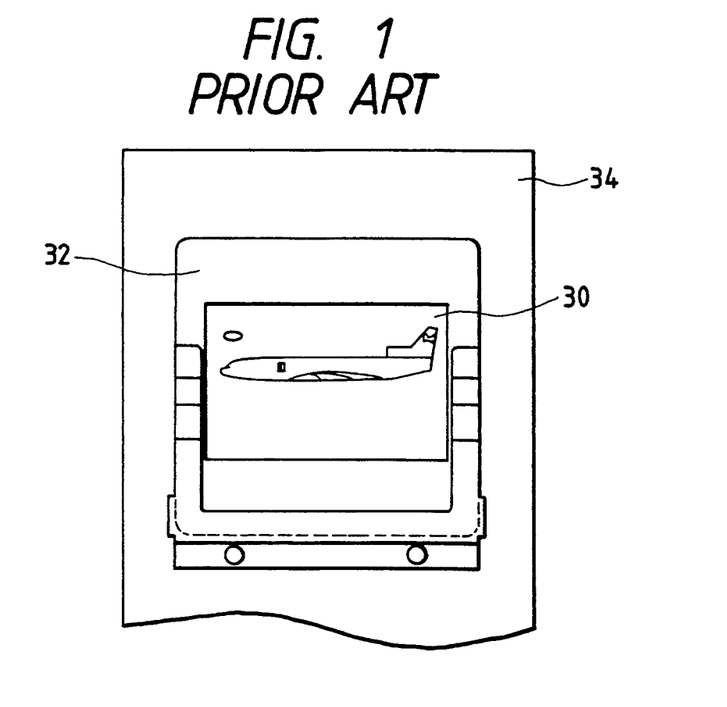
FIG. 1 is a front view showing a manner of retaining a film mount in prior art.
Figure 2:
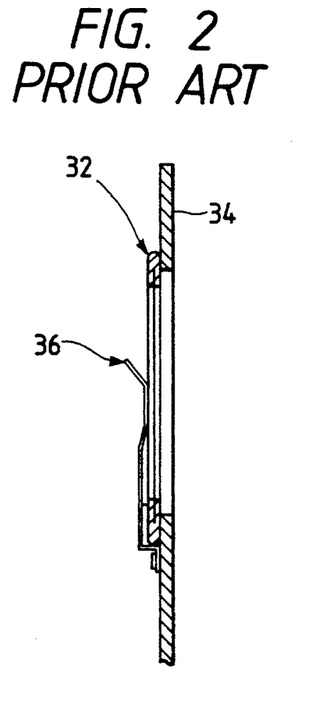
FIG. 2 is a side view showing the manner of retaining the film mount in the prior art.

In a prior art slide film image reading apparatus, a 35 mm light permeable film 30 to be read is mounted on a slide mount 32 during the read operation, as shown in FIGS. 1 and 2. In this case, in a conventional image reading apparatus, the slide mount 32 is held by a film retention spring 36 of a slide mount table 34.

However, a thickness of the slide mount may differ from type to type of the slide film and an optical axial position of the slide film may significantly deviate from a design optimum point of the apparatus. Thus, exact focusing may not be attained depending on the type of the slide film and a resolution of the read image data may be lowered.

Figure 3:
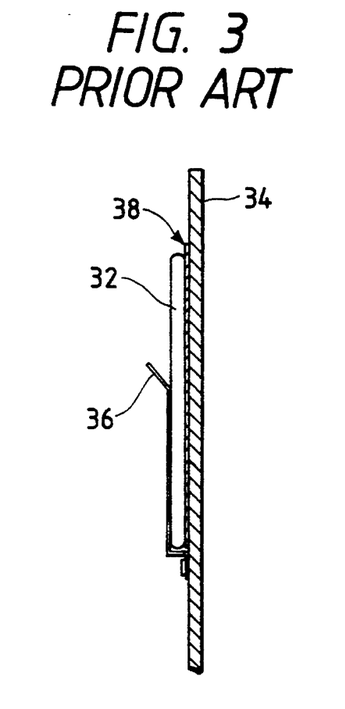
FIG. 3 is a side view showing a manner of adjusting a position of a slide film in prior art.

In order to solve the above problem, a method for inserting a spacer 38 of an appropriate thickness between the film mount 32 and the film mount table 34 has been proposed, as shown in FIG. 3. In this method, however, whenever a different type of slide film is to be used, one of several spacers having different thickness prepared by a manufacturer, which is optimum to the film mount to be used should be selected. This is troublesome work. Further, if an improper spacer is selected, it is not detected until the read data is outputted to a CRT display after a series of image read operation and the result is visually checked. Accordingly, whether the apparatus fully performs its function or not largely depends on the experience and judgement of the user.

A method for moving the slide film along the optical axis has been proposed. However, this method requires not only a sub-scan direction drive mechanism for reading the image but also an optical axis drive mechanism for focusing, and the apparatus is complex.

A technique to focus by moving a projection lens itself is common in a focusing device but magnification changes each time a different type of slide film is used.

Apart from the above problems, the apparatus has another problem as described below.

The slide film to be read by the apparatus usually has a strong warp property. Thus, because of a mount operation of the film to the film mount or subsequent temperature and humidity change, the film has more or less warp even after it has been held by the film mount.

In a reading apparatus having a fixed relative positional relationship between the slide film and the optical axis of the focusing lens and the image pickup element, focusing may be attained within the read range even if a certain degree of warp is included, if a depth of focus of the optical system is large.

Figure 4:
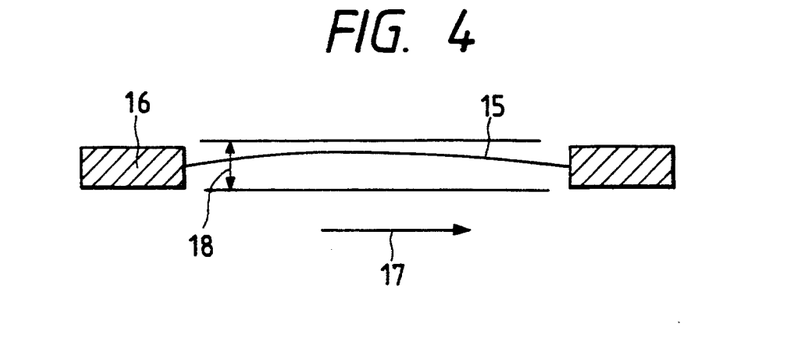
FIGS. 4 and 5 are sectional views illustrating warps of the slide film.

This method is explained with reference to FIG. 4. Numeral 15 denotes a film, numeral 16 denotes a section of a film mount and numeral 18 denotes a depth of focus.

It shows that the film 15 includes a warp relative to a direction 17 of film movement during the image scan but the entire film 15 is within the depth of focus 18. In this state, the film 15 is focused everywhere.

Figure 5:
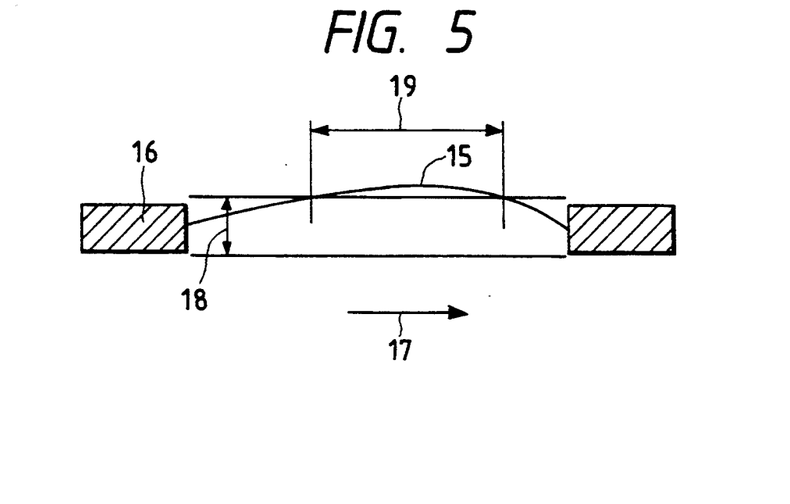

However, if the film 15 includes a warp which is beyond the depth of focus, defocusing may occur depending on a read area on the film 15. FIG. 5 shows such a state. Since the warp of the film 15 is larger than the depth of focus 18, defocusing occurs at an area 19 of the film 15.

Increasing the depth of focus means the darkening of the optical system and it requires expanding a storage time so that the image pickup element can acquire a sufficient amount of light. As a result, an S/N ratio of the image signal is lowered.

SUMMARY OF THE INVENTION

In accordance with a first aspect of the present invention, it is an object to provide an image reading apparatus which solves the problem due to the variation in the thickness of the slide film, has an automatically controlled, inexpensive and compact focusing mechanism and permits high resolution reading of image data without requiring a special operation or experience of a user.

According to the first aspect of the present invention, there is provided an image reading apparatus comprising:

- an image sensing optical system including an image pickup element for converting an image to an electrical signal and a projection lens for projecting an image onto a photo-sensing plane of the image pickup element; and
- focus adjusting means for driving the image sensing optical means along an optical axis thereof while maintaining a relative positional relationship between the projection lens and the image pickup element to adjust a focal position of the image sensing optical system.

Figure 6:
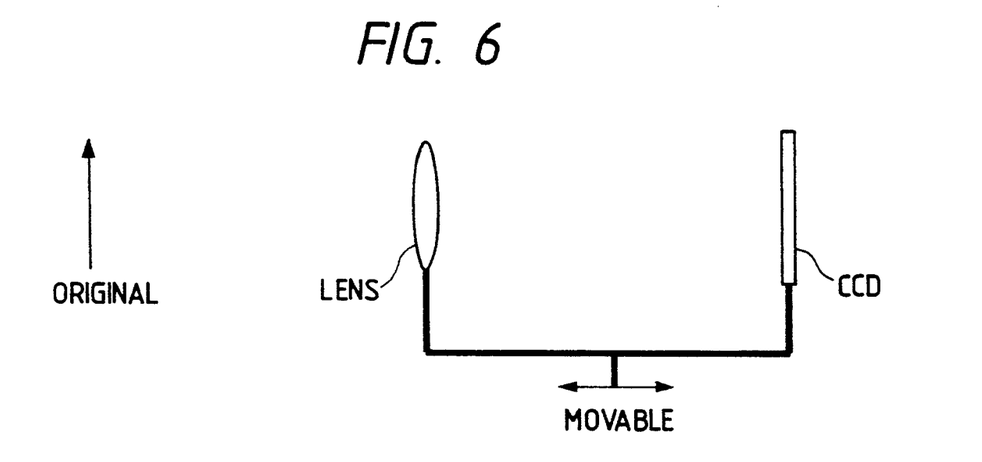
FIGS. 6, 7 and 8 show a schematic configuration of a first aspect of the present invention.

In the image reading apparatus of the present invention thus constructed, the image sensing optical system moves along the optical axis integrally. This is explained with reference to FIG. 6. The drive means of the present invention drives the image sensing optical system along the optical axis integrally without changing the relative positional relationship (for example, mutual distance) between the projection lens and the focal plane of the image pickup element. In FIG. 6, CCD is shown as the image pickup element for the convenience of explanation, and the projection lens and the CCD disposed at a predetermined focal point move integrally. Thus, even if the position of the object varies, the magnification of the image sensing optical system itself does not change because of the movement of the image sensing optical system by the drive means, and the focusing can be attained by a simple mechanism.

Accordingly, in the image reading apparatus of the present invention, if an optical axial position of the slide film deviates by a different type of slide mount, the image sensing optical system is driven along the optical axis by the focus adjusting means. The image sensing optical means is thus arranged at an optimum focusing position while an optical path length of the image sensing optical system is kept constant. Accordingly, constant magnification and best focused image data are readily attained.

Figure 7:
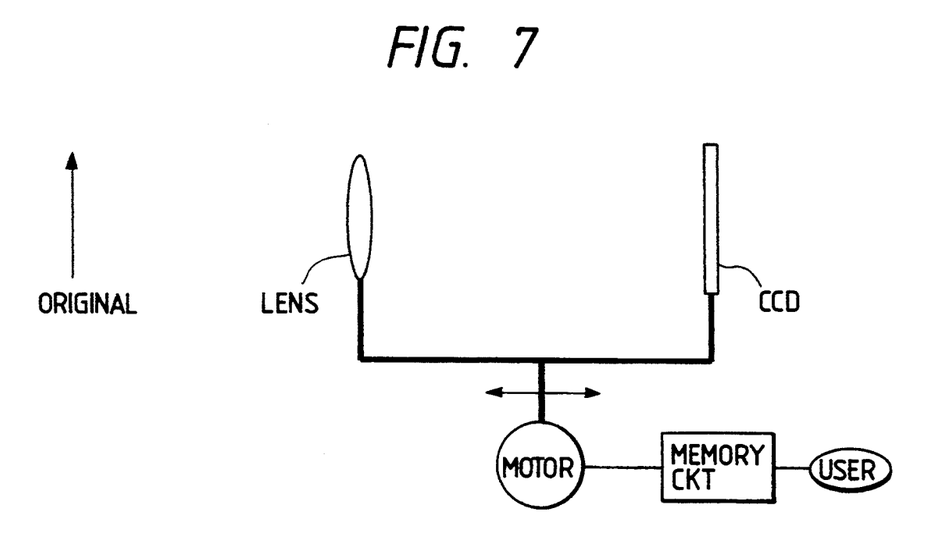

By storing focal position data of different slide films and determining the position of the image sensing optical system by the focus adjusting means based on the user-selected focal position data of the slide film to be used (see FIG. 7), the focusing operation by the focus adjusting means for each slide film may be eliminated.

The present apparatus may further comprise means for detecting an in-focus position of the image sensing optical system to the object; and control means for controlling the focus adjusting means so that the image sensing optical means is disposed at the in-focus position to the object in accordance with the output of the detection means.

Figure 8:
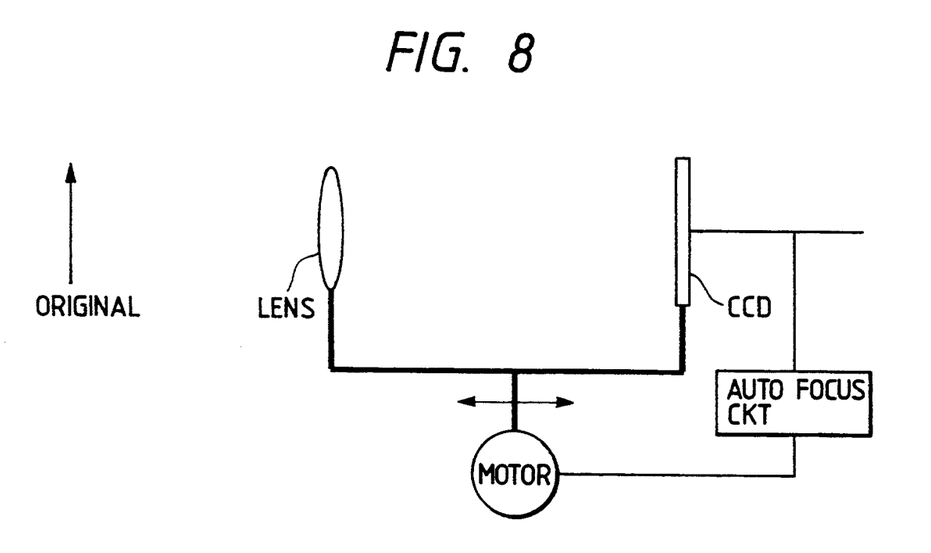

As shown in FIG. 8, the control means may be an AF circuit which controls the focus adjusting means in accordance with detection data of in-focus position detection means. In this manner, image data which are automatically controlled to maintain a best in-focus condition without regard to the type of slide film are easily attained.

A second aspect of the present invention is directed to solving a problem due to the warp of the slide film, and it is an object of the present invention to provide an apparatus which assures an in-focus read image whatever the warp is and also assures a high quality of image by permitting the use of a large aperture optical system.

According to the second aspect of the present invention, there is provided an image reading apparatus comprising:

an image sensing optical system including an image pickup element for scanning an image to convert it to an electrical signal and a projection lens for projecting an image onto a photo-sensing plane of the image pickup element;

focus adjusting means for adjusting a focal position of the image sensing optical system;

means for detecting an in-focus position of the image sensing optical system to the object; and control means for controlling the focus adjusting means so that the object is always within a depth of focus of the image sensing optical means in accordance with the output of the detection means.

Preferably, the in-focus position detection means detects the in-focus position at a plurality of predetermined positions on the image pickup element.

In the present apparatus, when the image of a slide film is scanned by the image pickup element, the in-focus point of the slide film is detected, and when the image is read, the control means controls the focus adjusting means so that the focal position of the optical system is adjusted such that the slide film is always within the depth of focus.

The control means may detect the in-focus position during the scan of the image to adjust the focal position of the optical system, or adjust the focal position during the reading of the image in accordance with the predetected in-focus position.

In the image reading apparatus of the second aspect of the present invention, the in-focus image is always attained at every point on the slide film being read even if the slide film is warped.

Further, the depth of focus need not be as large as that of the prior art and the optical system may be of small aperture and the storage time may be long so that affecting the image quality is eliminated. Conversely, the depth of focus may be smaller than that of prior art so that a sharper and lighter image is attained.

DETAILED DESCRIPTION OF THE PREFERRED EMBODIMENTS

An embodiment of the first aspect of the present invention is first explained.

Figure 9:
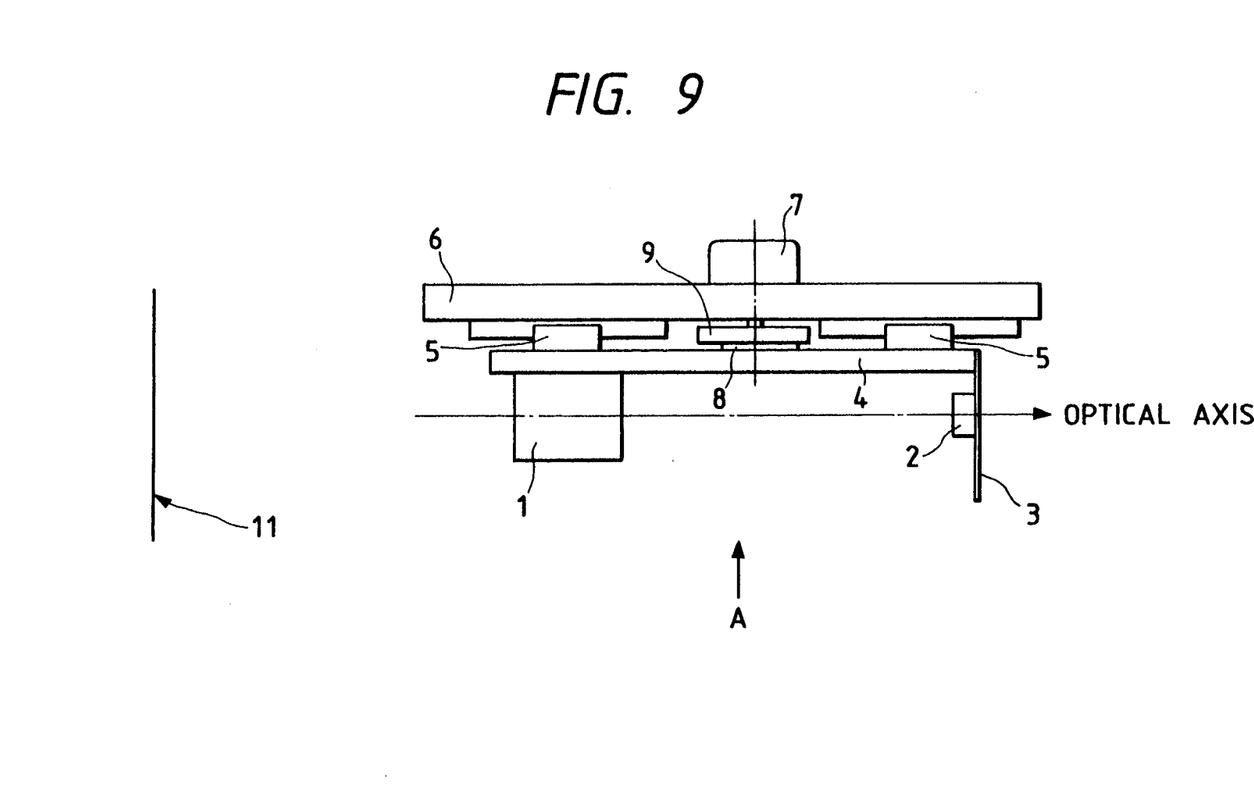
FIG. 9 shows an image reading apparatus in accordance with one embodiment of the first aspect of the present invention.
Figure 10:
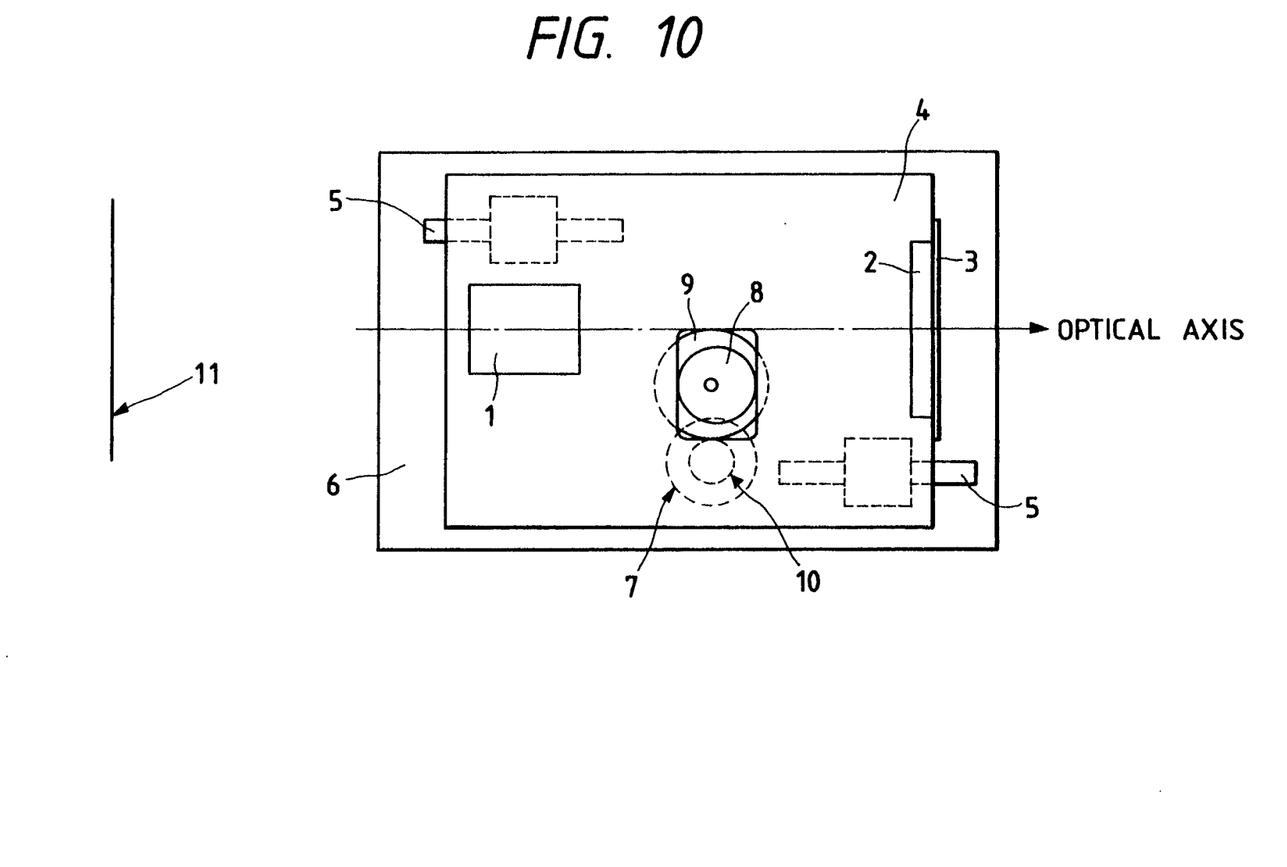
FIG. 10 is a view from a direction A of FIG. 9.

FIGS. 9 and 10 show an image sensing optical system and drive means therefor of an image reading apparatus in accordance with one embodiment of the first aspect of the present invention.

A projection lens 1 together with a printed circuit board 3 for mounting a CCD 2 which functions as an image pickup element are held by an optical system base 4 to form an image sensing optical system.

The optical system base 4 is held by a drive system base 6 through a guide 5 so that it is movable along an optical axis of the image sensing optical system. A stepping motor 7 and an eccentric cam 8 are mounted on the drive system base 6 and a gear 9 is integrally formed with the eccentric cam 8. The gear 9 is driven through a gear 10 which is fixed to a drive shaft of the stepping motor 7, and the eccentric cam 8 contacts an end plane of a square hole formed in the optical system base 4 to convey a drive force in the optical axis direction to the optical system base 4.

In the present apparatus, when the slide film to be read is arranged at a focal point 11 of the image sensing optical system while it is mounted on the slide mount, the image is read assuming that it is in a proper in-focus state. Accordingly, if the thickness of the slide mount varies because of a different type of slide mount, the position of the slide film also changes, and the gear 10 fixed to the shaft of the stepping motor 7 is rotated by a certain angle accordingly. In the drive system, the gear 9 is rotated through the gear 10 and the eccentric cam 8 which is integral with the gear 9 is rotated by a certain angle. The optical system base 4 which contacts the eccentric cam 8 is driven along the optical axis and the entire image sensing optical system is driven along the optical axis. In this manner, the image is read in a proper in-focus state even if the type of slide mount changes.

By detecting the in-focus state of the image sensing optical system and feeding it back to the drive system (so-called auto-focusing control), the image can be read with a constantly proper in-focus state.

The means for detecting the in-focus state is not restrictive. For example, an output signal of a CCD 2 may be monitored to detect the in-focus state by a high contrast output and it may be fed back to the motor 7.

On the other hand, where the types of film mounts to be used are limited, the AF control system need not be provided but several values set by the types of film mounts may be stored in the control circuit or the drive circuit and the image sensing optical system may be driven under the user's direction in accordance with the film mount to be used.

Figure 11:
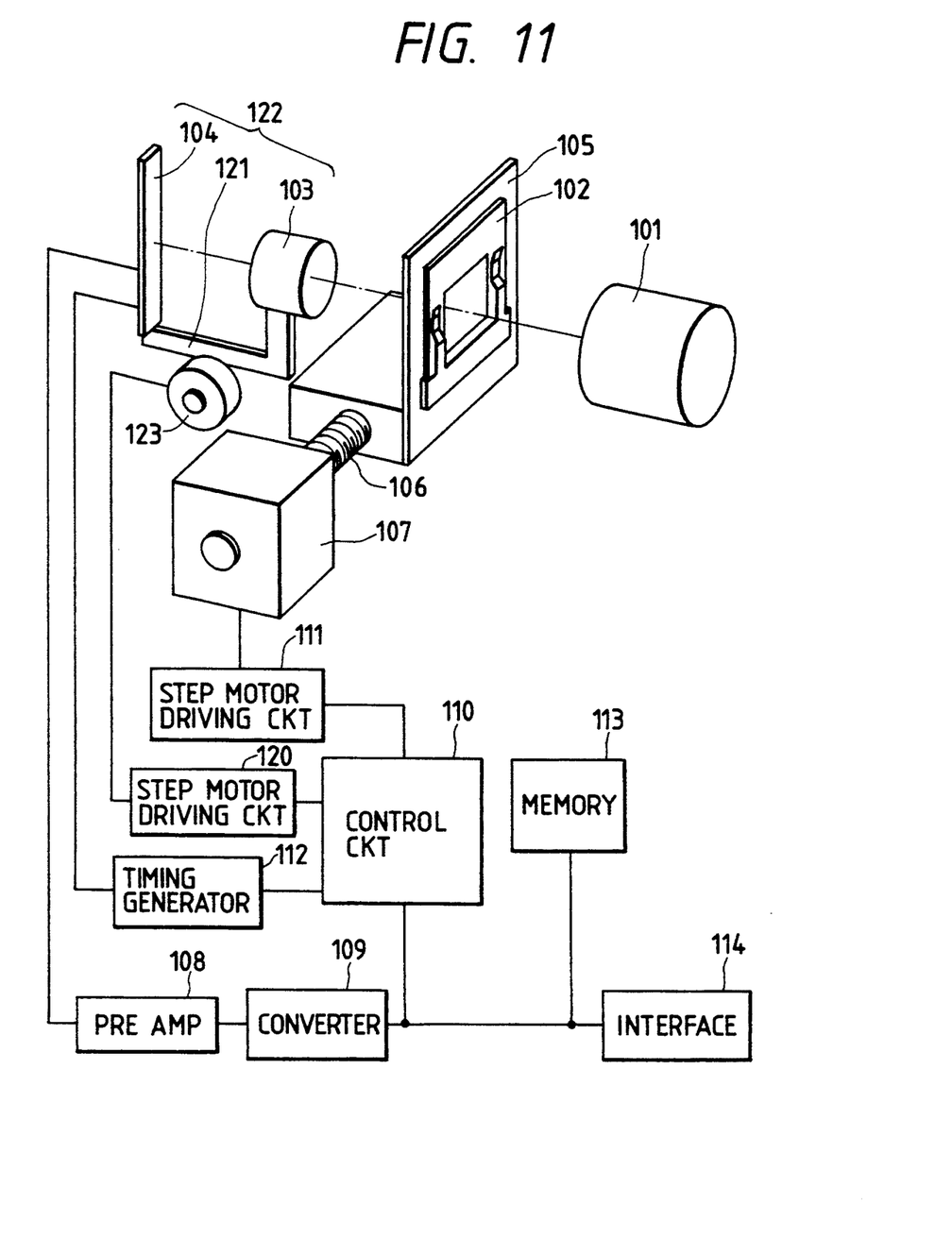
FIG. 11 shows an image reading apparatus in accordance with an embodiment of a second aspect of the present invention.

An embodiment of the second aspect of the present invention is now explained. FIG. 11 shows an image reading apparatus in accordance with the second aspect of the present invention.

A slide film 102 mounted on a film mount is held in a film holder 105. The slide film 102 is illuminated by a predetermined illumination light 101 and an image of the slide film 102 is formed on a photo-sensing plane of an image pickup element 104 which may be a CCD by light from the illumination light source 101 through a focusing lens 103. The film holder 105 is movable across the optical axis by a sub-scan lead screw 106 rotated by a stepping motor 107. The image focused on the image pickup element 104 is scanned by the parallel movement of the film holder 105. The image pickup element 104 is arranged such that the scan direction thereof is orthogonal to the direction of scanning of the focused image.

The stepping motor 107 and the image pickup element 104 are controlled by a control circuit 110, and an image signal output from the image pickup element 104 together with position information of the stepping motor 107 are supplied to the control circuit 110 in the form of digital data through an A/D converter 109.

The control circuit 110 drives the stepping motor 107 through a stepping motor drive circuit 111 to intermittently drive the film holder 105 at a constant interval, and the image signal output of the image pickup element 104 is converted to digital data by the A/D converter 109 for each intermittent movement.

The data received by the control circuit 110 is stored in a memory 113, and if necessary, it is supplied to an external equipment through an interface 114 for use as image data.

In the present apparatus, the focusing lens 103 and the image pickup element 104 are fixed with a constant distance therebetween by focus adjusting block 122.

The focus adjusting block 122 is driven along the optical axis by the rotation of the stepping motor 123 which is controlled by the control circuit 110 to enable focus adjustment to the slide film 102, (an interlocking mechanism for the focus adjusting block 122 and the stepping motor 123 is not shown.) The focus adjustment by the stepping motor 123 is stepwise and an increment in one step is smaller than the depth of focus of the optical system including the focusing lens 103.

An embodiment of means for detecting the in-focus state of the slide film is now explained. In the present embodiment, when a contrast of outputs for pixels corresponding to respective positions on the slide film is maximum, the in-focus state is detected.

In the present embodiment, the focus adjusting block is moved step by step at a predetermined film position, and contrasts at the respective steps are measured to detect the in-focus state. The contrast is measured by determining differences between outputs of adjacent predetermined number of pixels in the CCD which forms the image pickup element 104 and summing the differences.

Figure 12:
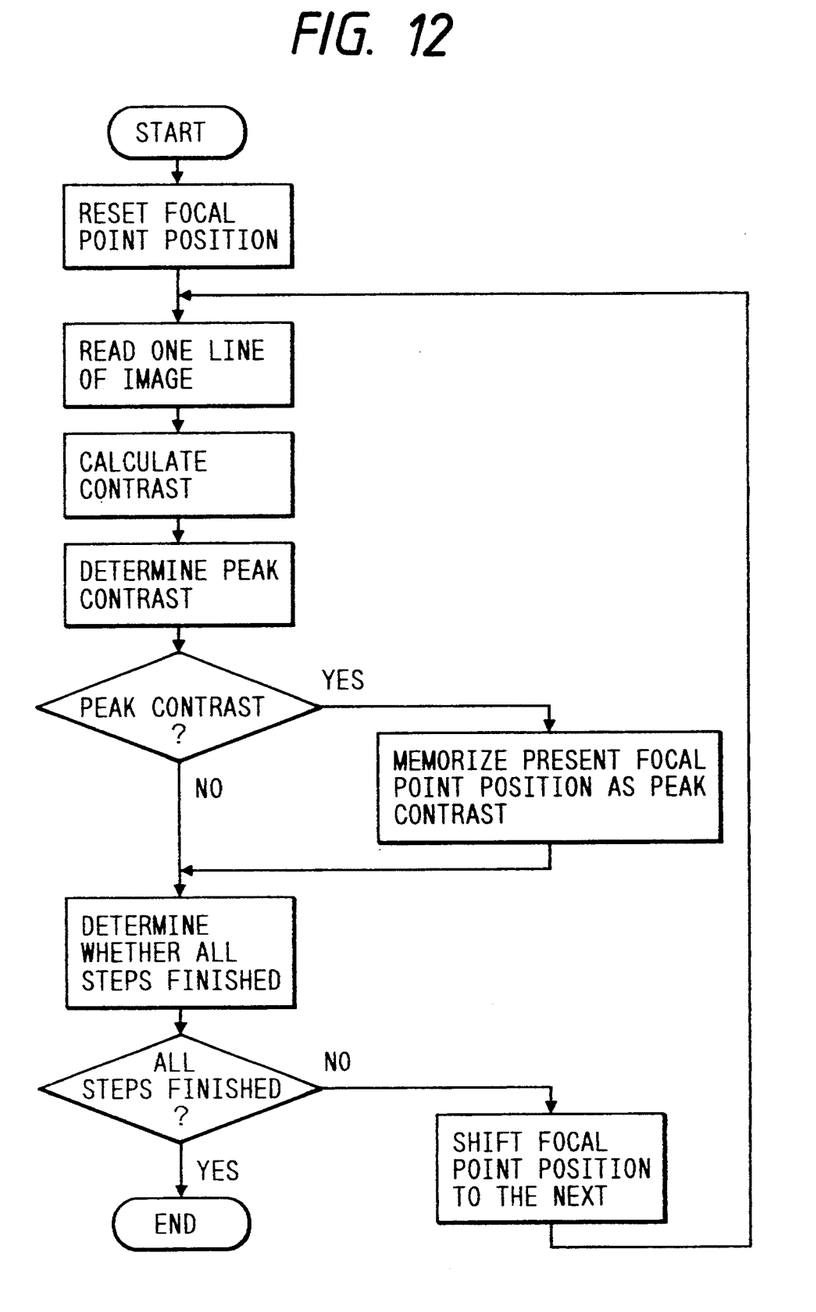
FIG. 12 is a flow chart of an algorithm 10 for detecting an in-focus position in the apparatus of FIG. 11.

In the present embodiment, the contrast is measured for each read area (one scan line) on the slide film to detect the in-focus state by the focus adjusting block position which causes the maximum contrast, as shown in the flow chart of FIG. 12.

Figure 13:
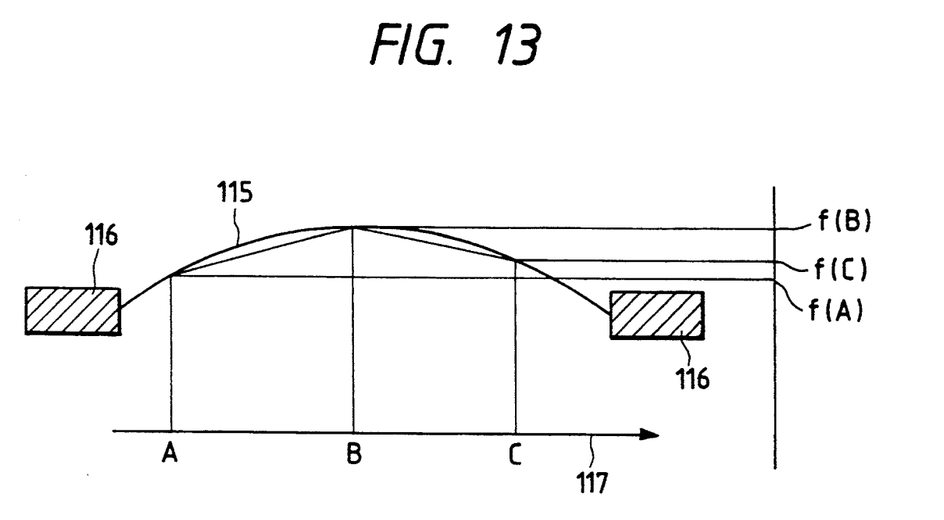
FIG. 13 shows a relation between a scan position and an in-focus position in the apparatus of FIG. 11.
Figure 14:
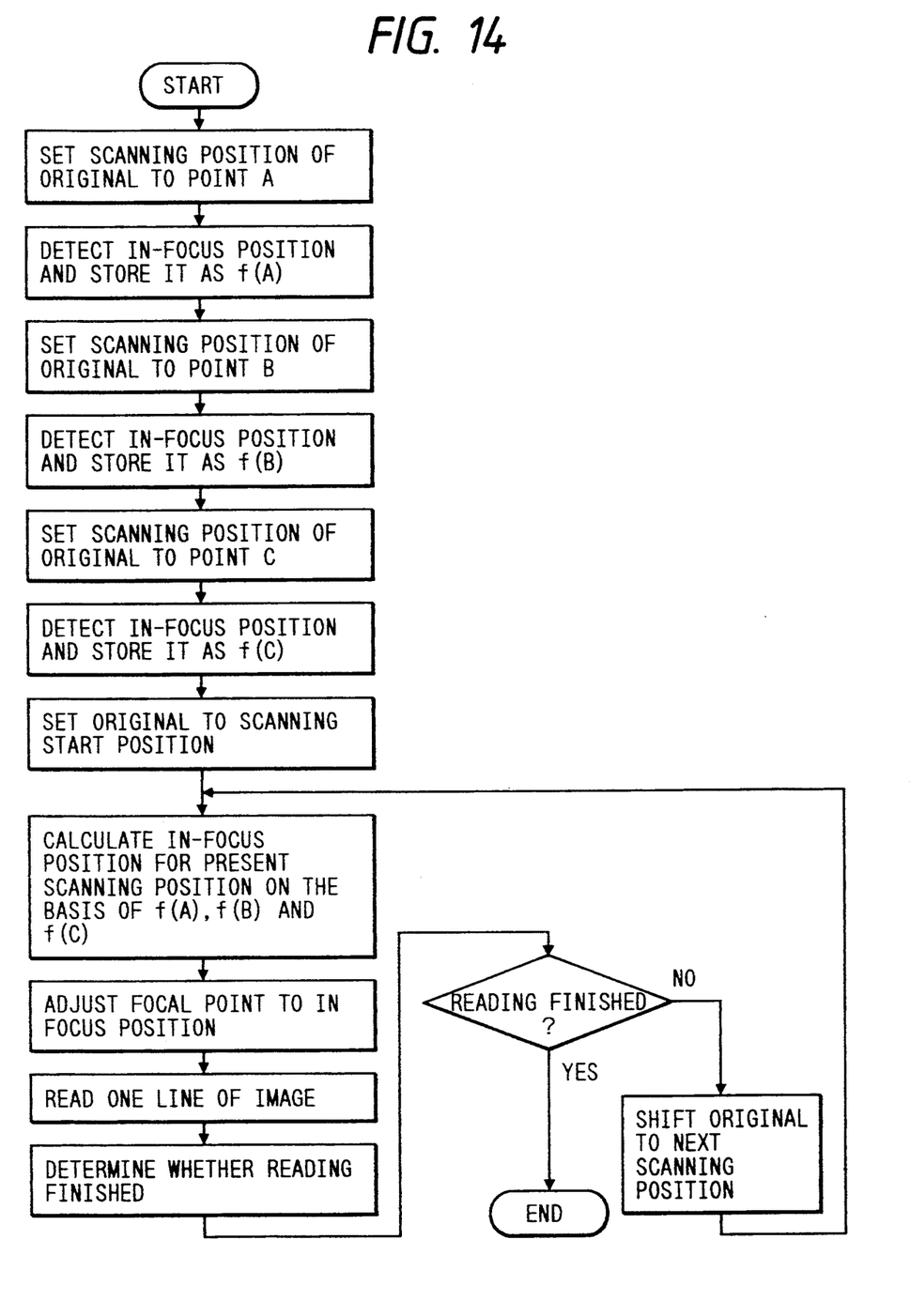
FIG. 14 is a flow chart of an operation of in-focus detection means.

In the present embodiment, a simple approximation method is used as the detection means for the in-focus position information at each position on the slide film. This is explained with reference to FIGS. 13 and 14. FIG. 13 shows a sectional view of the slide film 102. It shows that the film 115 includes a warp with respect to the direction 117 of movement. Points A and C on the film 115 show the opposite ends of the image read area, and a point B is a mid-point. FIG. 14 shows a flow chart of an algorithm for detecting the in-focus state at each point on the slide film in the apparatus shown in FIG. 11.

In the present embodiment, prior to the start of reading the image on the slide film, the in-focus states are detected at the points A, B and C on the slide film shown in FIG. 13 in accordance with the algorithm shown in FIG. 12. The detected in-focus states f(A), f(B) and f(C) are stored in the memory 13, the control circuit 10 or other circuit.

The in-focus state at each point on the slide film is calculated based on f(A), f(B) and f(C).

Since it may be assumed that the slide film usually warps uniformly over the entire surface, the in-focus state (approximate position) at each point can be easily calculated by approximating the arcs between points A-B and the points B-C by straight lines.

Since the warp of the slide film has a gentle curve, a small error is included when the approximate straight line is used but the error does not affect the focusing if the depth of focus of the optical system is set larger than an anticipated error. It should be noted that such depth of focus is much smaller than the depth of focus required to cover the entire film surface in the prior art.

When the image is scanned, the focus adjusting means is activated so that the in-focus position at the current slide film position determined by the above method is attained when the slide film is moved for each scan line.

The above focus adjustment is repeated each time the slide film is moved until the read operation is completed so that the in-focus state is always maintained for each point on the slide film.

In the present embodiment, the in-focus states are measured for the three points on the slide film and the in-focus states at the points between those three points are interpolated by the linear approximation to simplify the detection of the in-focus states, although it is not restrictive.

For example, the in-focus states may be measured for more than three points to more precisely interpolate, or curved interpolation (for example, a curve which fits better to the warp of the slide film) rather than the linear interpolation may be used without departing from the present invention. Instead of the linear or curved interpolation, the in-focus states for the respective lines on the slide film may be stored and the focus adjusting block 122 may be adjusted for each movement of the slide film 102 in accordance with the stored information to read the image.

In the present embodiment, the contrast of the image output is utilized to detect the in-focus state although other methods may be used. For example, separate optical means for detecting the in-focus state may be provided to detect by a phase difference detection method, or simple direct measurement method or a physical sensor may be used to measure the warp of the film and the in-focus state of the film.

In the focus adjusting mechanism of the present embodiment, the relative positional relationship between the optical system 103 and the image pickup element 104 is fixed and moved integrally to adjust the focal position of the optical system. In this method, the magnification does not change and is kept constant. However, the focus adjustment is not limited to this methods but other method may be used.

The present invention is applicable not only to the warp of the film but is also applicable to compensate for the change in the focal position when the thickness of the film mounts is not uniform or the size (particularly thickness) of the film mounts varies from maker to maker.

What is claimed is:

1. An image reading apparatus which reads an image of an original by performing main scanning and sub-scanning of the image in different directions and processes the scanned image, comprising:
   in-focus position detection means for detecting in-focus positions of an image taking optical system at a predetermined plurality of positions on said original;
   approximation means for conducting approximation by linear or curved interpolation between in-focus positions detected by said in-focus position detection means;
   focus adjusting means for causing said image taking optical system to be in-focus for said original on the basis of the result of said approximation obtained by said approximation means; and
   control means for controlling said focus adjusting means in such a way that said image taking optical system becomes in-focus for scanned positions of said original which shift in accordance with said main scanning.

2. An apparatus according to claim 1 wherein said in-focus position detection means detects in-focus positions at three positions on said original, said three positions corresponding to opposite ends and center of a read range of said original.

3. An apparatus according to claim 1 wherein said in-focus position detection means detects the in-focus positions by measuring contrast of the image.

4. An apparatus according to claim 1 wherein said control means controls said focus adjusting means in such a way that said original is always kept within a predetermined depth of focus of said image taking optical system.

5. An image reading apparatus comprising:
   a light source for emitting light;
   an original which is illuminated with said light;
   an image taking optical system including a projection lens for projecting light from the original and an image pickup element for receiving the light projected by said projection lens; and
   a focus adjuster for relatively moving said image taking optical system and said original on an optical axis of said image taking optical system so as to perform a focus adjustment of the image taking optical system with respect to the original;
   wherein relative positional relationship between said projection lens and said image pickup element of said image taking optical system is kept unchanged during the focus adjustment.

6. An apparatus according to claim 5, wherein said focus adjuster performs said focus adjustment with respect to a surface of said original in accordance with an output from said image pickup element.

* * * * *